R. S. BARTLETT.
Grain-Baskets

No. 149,285.

Patented April 7, 1874.

Witnesses.
D. P. Cool
Edmund Masson

Inventor.
Roland S. Bartlett.
By Atty. A. B. Stoughton.

UNITED STATES PATENT OFFICE.

ROLAND S. BARTLETT, OF NORTHAMPTON, MASSACHUSETTS, ASSIGNOR TO WILLIAMS MANUFACTURING COMPANY, OF SAME PLACE.

IMPROVEMENT IN GRAIN-BASKETS.

Specification forming part of Letters Patent No. 149,285, dated April 7, 1874; application filed February 21, 1874.

*To all whom it may concern:*

Be it known that I, ROLAND S. BARTLETT, of Northampton, in the county of Hampshire and State of Massachusetts, have invented certain new and useful Improvements in the Manufacture of Baskets; and I do hereby declare that the following is a full, clear, and exact description of the same, reference being had to the accompanying drawings, making a part of this specification, in which—

Figure 1:
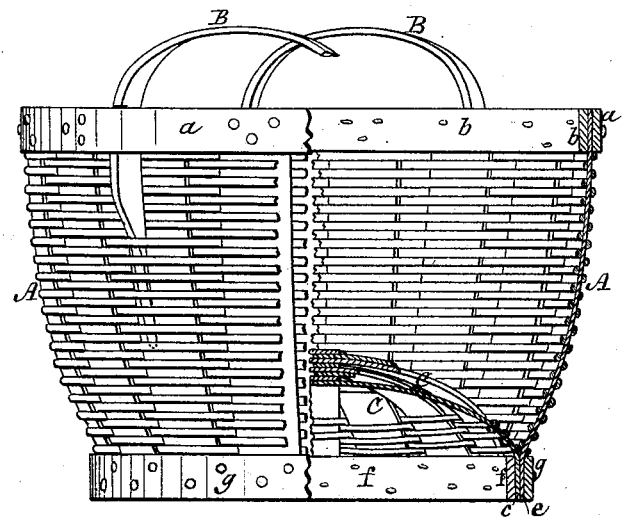
Figure 2:
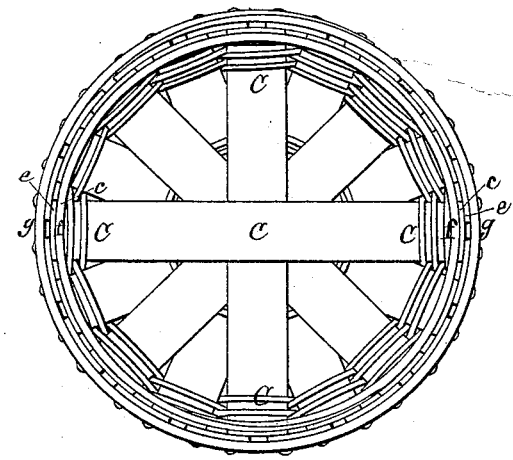

Figure 1 represents one of the baskets partially in sectional elevation and partially in full elevation. Fig. 2 represents a view of the bottom of the basket.

I am aware that baskets have been made with a latticed frame bottom, which frame was covered with a splint bottom, and that a solid or board-bottom basket has been made with an arched splint filling inside nailed to said board bottom, and that the sides of a splint basket have been nailed or riveted to such latticed frames and such solid or board bottoms. I lay no claim to either of these things.

My invention consists in an all-splint basket, the side and bottom of which are separately made, and their under edges then laid together with an interior and an exterior hoop, and the whole nailed or riveted through and through to form a rim or chine to the basket, as will be explained.

The side A of the basket is made of woven splints, in the usual well-known way, the ribs of the basket extending from the top to the bottom only of said side, and the top of the basket is strengthened by the usual inside and outside hoops *a b*, nailed or riveted through and through, and supplied with handles B, in any of the well-known ways. The bottom C of the basket is woven separately from the side, and this bottom is of arched form, which adds materially to its strength and capability of carrying heavy loads without breaking down, or readily wearing out. The lower edge *c* of this arched bottom, when the said bottom is slipped into the body or cylindrical portion of the basket, comes snugly against the inner perimeter *c* of said body or cylindrical portion, and then, the interior and exterior hoops *f g* being put in their positions against the edges *c e*, the whole are nailed or riveted together, and when so united these four pieces or parts—viz., *c e* and *f g*—form a very firm and substantial rim or chine, upon which the basket stands, and which sustains and supports both the bottom and sides with the weight or load carried in the basket.

I have shown only a round basket, but propose to make the baskets, as above described, in any of the well-known forms or shapes, as may be desired.

Having thus fully described my invention, what I claim is—

In an all-splint basket, the bottom of which is arched and made separate from the side, the said bottom and side joined by means of the rims or edges *c e* and the hoops *f g*, nailed or riveted together to make a strong and solid chine to support and strengthen the basket, substantially as described.

ROLAND S. BARTLETT.

Witnesses:
D. W. BURK,
H. H. BOND.